(12) United States Patent
Berkema et al.

(10) Patent No.: US 7,385,718 B2
(45) Date of Patent: Jun. 10, 2008

(54) PRINT BY REFERENCE METHOD FOR PORTABLE WIRELESS DEVICES

(75) Inventors: Alan Chris Berkema, Granite Bay, CA (US); Jeff Morgan, Cupertino, CA (US); Pat Stoltz, San Diego, CA (US); Todd Fischer, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1391 days.

(21) Appl. No.: 09/897,653

(22) Filed: Jun. 29, 2001

(65) Prior Publication Data

US 2003/0003957 A1    Jan. 2, 2003

(51) Int. Cl.
*G06K 15/00* (2006.01)
(52) U.S. Cl. .................. 358/1.15; 707/10; 709/208
(58) Field of Classification Search ............... 358/1.1, 358/1.12, 1.13, 1.14, 1.15, 407
See application file for complete search history.

(56) References Cited

U.S. PATENT DOCUMENTS

| | | | |
|---|---|---|---|
| 5,848,413 A * | 12/1998 | Wolff | 707/10 |
| 5,862,321 A * | 1/1999 | Lamming et al. | 709/200 |
| 5,915,214 A | 6/1999 | Reece | |
| 5,974,416 A | 10/1999 | Anand | |
| 6,173,407 B1 | 1/2001 | Yoon | |
| 6,184,996 B1 | 2/2001 | Gase | |
| 6,189,788 B1 | 2/2001 | Sherman | |
| 6,324,521 B1 | 11/2001 | Shiota | |
| 6,347,340 B1 | 2/2002 | Coelho | |
| 6,379,058 B1 | 4/2002 | Petteruti | |
| 6,400,272 B1 | 6/2002 | Holtzman | |
| 6,407,820 B1 | 6/2002 | Hansen | |
| 6,448,906 B1 * | 9/2002 | Nachtsheim et al. | 340/945 |
| 6,452,689 B1 | 9/2002 | Srinivasan | |
| 6,501,832 B1 | 12/2002 | Saylor | |
| 6,601,102 B2 | 7/2003 | Eldridge | |
| 6,738,841 B1 * | 5/2004 | Wolff | 710/62 |
| 6,744,528 B2 | 6/2004 | Picoult | |
| 6,757,749 B2 | 6/2004 | Aoki | |
| 6,772,338 B1 | 8/2004 | Hull | |
| 6,778,289 B1 | 8/2004 | Iwata | |
| 6,782,542 B1 | 8/2004 | Mein | |
| 6,842,460 B1 | 1/2005 | Olkkonen | |

(Continued)

FOREIGN PATENT DOCUMENTS

EP    0886206    12/1998

(Continued)

OTHER PUBLICATIONS

Z. Pie, L. Weidong, W. Jing, W. Youzhen, "Bluetooth—The Fastest Developing Wireless Technology", IEEE, vol. 2, Aug. 21, 2000, pp. 1657-1664.

*Primary Examiner*—Jerome Grant, II

(57) ABSTRACT

A print by reference method for a portable wireless device allows the portable wireless device to obtain a reference that indicates where a print content is located and to wirelessly communicate the reference to a print device causing the print device to use the reference to locate and obtain a desired set of print content and further causing the print device to print the desired print content. Alternatively, the method may cause the portable wireless device to communicate the reference to a print service which responds to the reference by downloading the print content and then forwarding the print content to a print device for printing.

13 Claims, 7 Drawing Sheets

U.S. PATENT DOCUMENTS

| | | |
|---|---|---|
| 6,857,023 B2 | 2/2005 | Rivadalla |
| 2001/0016921 A1 | 8/2001 | Takahashi |
| 2001/0037462 A1 | 11/2001 | Bengtson |
| 2001/0048533 A1 | 12/2001 | Koana |
| 2002/0002592 A1 | 1/2002 | Aoki |
| 2002/0032652 A1* | 3/2002 | Aoki et al. .............. 705/40 |
| 2002/0061183 A1* | 5/2002 | MacInnis .............. 386/68 |
| 2002/0078160 A1* | 6/2002 | Kemp et al. ............ 709/208 |
| 2002/0083114 A1 | 6/2002 | Mazzagatta |
| 2002/0188646 A1 | 12/2002 | Terrill |

FOREIGN PATENT DOCUMENTS

| | | |
|---|---|---|
| EP | 0893760 | 1/1999 |
| EP | 0936 808 | 8/1999 |
| EP | 0 974 890 | 1/2000 |
| GB | 2 342 197 | 4/2000 |
| GB | 2356321 | 5/2001 |
| WO | WO 01/33365 | 5/2001 |
| WO | WO 01/42894 | 6/2001 |

* cited by examiner

PRINT BY REFERENCE METHOD FOR PORTABLE WIRELESS DEVICES

FIELD OF THE INVENTION

A field of the invention is portable wireless devices. An additional field of the invention is printing.

BACKGROUND OF THE INVENTION

Portable wireless devices such as personal digital assistant (PDA) devices and portable wireless handsets, e.g., cell phones, enjoy widespread popularity. In particular, the portable, hand-held characteristics of these devices provide users with access to information and communication outlets in ways that were never before available. To ensure the continued popularity of portable wireless devices, attempts are being made to further expand the flexibility and capabilities of these portable wireless devices and to further enhance the services available to users of portable wireless devices. For example, portable wireless devices capable of accessing the Internet are available and Internet service providers that provide Internet access to portable wireless device users are becoming increasingly more common.

Unfortunately, the limited memory, display and bandwidth capabilities of portable wireless devices restrict the Internet content readily available to a portable wireless device user. Specifically, the Internet content available to the portable wireless device user is typically presented in a bare bones format so that portable wireless device capabilities are conserved. As a result, users will typically favor the richer Internet content available through traditional Internet connections such as workstations and computers unless circumstances such as travel prevent access to such computers. Thus, PDA devices and wireless handsets are typically used either to access highly basic content or to access content when circumstances prevent the user from accessing content from another device.

Printing offers the opportunity for a user to view rich content, and is often favored over viewing content through a full web browser or other application on a personal computer or work station. Unfortunately, the portable wireless devices, having limited capabilities, lack convenient printing mechanisms. Moreover, connecting a portable wireless device to a printer via a wired connection tends to defeat the purpose of having a portable wireless device.

One answer to these concerns is found in efforts to have the portable wireless devices communicate with peripherals and other devices through wireless communications. The Bluetooth RF communication format is directed toward expanding the utility of portable wireless devices by providing a short range, typically about ten meters, communication channel for communications between portable wireless devices and other Bluetooth capable devices. However, standing alone, the communication channel offers little to solve the print content dilemma faced by users of portable wireless devices. Specifically, due to memory and bandwidth limitations portable wireless devices are relatively poor portals to push content from or through to a printer, even with the convenience of a Bluetooth or other similar wireless communication capability.

SUMMARY OF THE INVENTION

Figure 1:
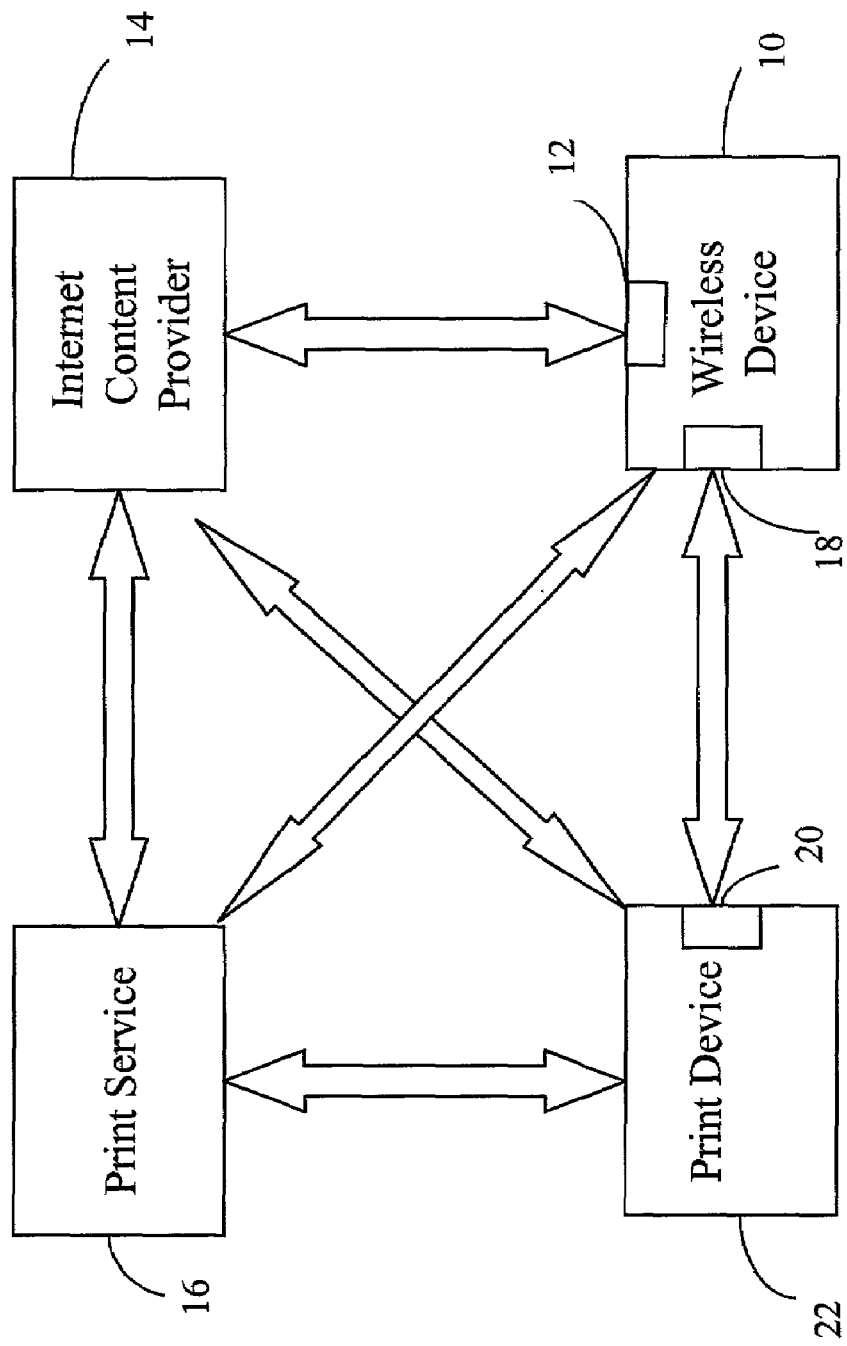
FIG. 1 is a block diagram of a communication network including a portable wireless device, a print device, an Internet content provider and a print service.

According to a method for performing a print by reference printing operation, a portable wireless device obtains a reference that indicates the location of print content on a network; and then wirelessly communicates the reference to a print device causing the print device to obtain the print content from the network and further causing the print device to print the print content obtained from the network. The method may further include steps directed to obtaining the reference by selecting a hyperlink displayed on a web site, storing the reference in a memory disposed in the communication device, or retrieving the reference from an e-mail message received by the portable wireless device. In addition, the method may include steps that allow a security access code to be included in the reference for use by the print device and/or a print service in obtaining access to the print content. Alternatively, the security access code may be used to authorize access to the print device or print service.

In a typical preferred example, the method may begin by obtaining a reference to desired print content while performing an operation such as web browsing over a wireless network. The obtained reference is wirelessly communicated to a print device causing the print device to access a print service which responds to the reference by using the reference to obtain the desired print content. Security data may be communicated to the print device for use in gaining access to the service offered by the print device. The method may be performed to obtain print content from any of a variety of print devices including, for example, a print device associated with an automated teller machine, a print device associated with a fast food restaurant drive-up menu board, a print device associated with a library and a print device associated with a grocery store. Further, the method may include the step of adding billing information to the reference to facilitate financial transactions related to the use of any or all of the print device, print service and content provider.

DETAILED DESCRIPTION

A simple form of the invention is a method by which a portable wireless device may perform a print by reference printing operation. The method generally involves obtaining a reference that indicates the location of desired print content on a network. The reference may be obtained by a variety of steps including but not limited to surfing the web, storing the reference in a memory device disposed in the portable wireless device, entry of the reference by a user of the portable wireless device or retrieving the reference from an e-mail stored in a memory device associated with the portable wireless device. The reference is wirelessly communicated to a print device causing the print device to obtain the desired information from the network and further causing the print device to print the desired information obtained from the network. These basic steps enhance the usefulness of portable wireless devices by expanding their printing capabilities with the use of a reference to content to be printed.

Figure 2:
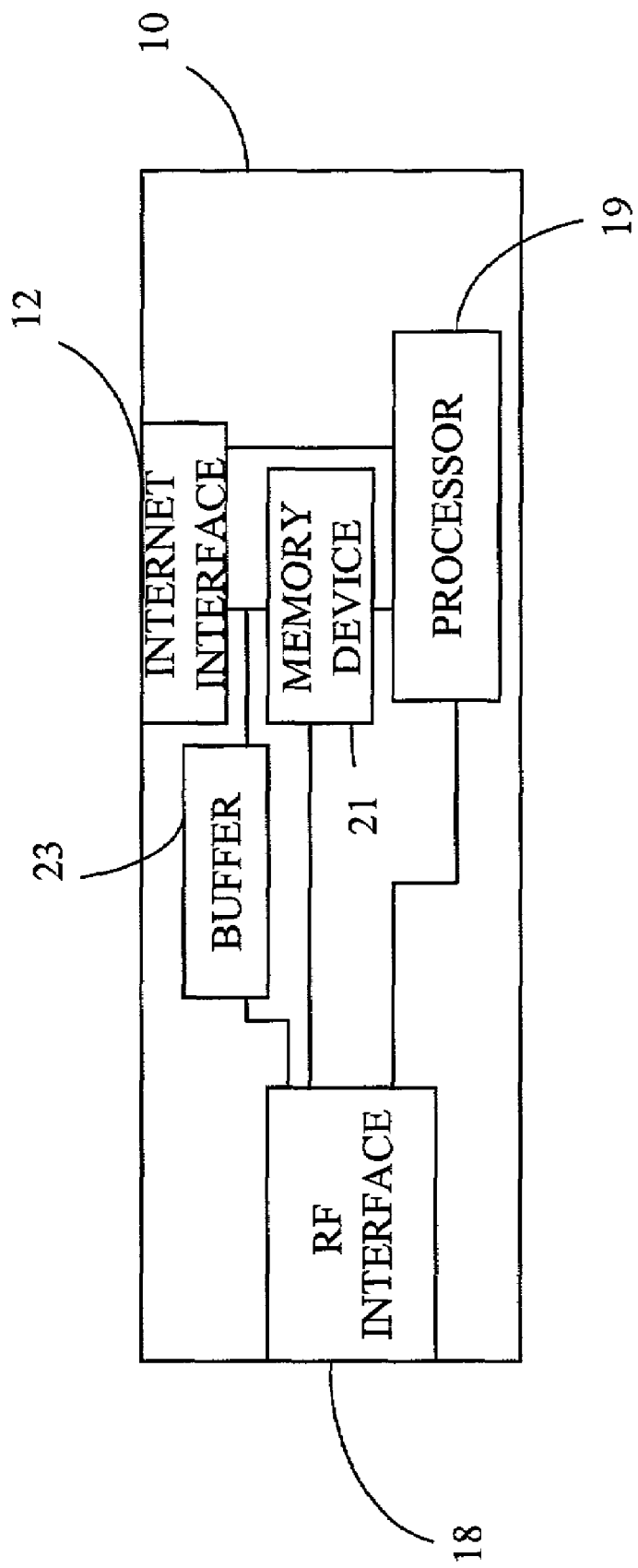
FIG. 2 is a block diagram of the portable wireless device of FIG. 1.

The present method for use in portable wireless devices may be conveniently understood by reference to a communication network as shown in FIG. 1 that a portable wireless device executing the method may use to conduct a print by reference operation. Specifically, and referring now to FIGS. 1 and 2, a portable wireless device 10 having print by reference capabilities may comprise, for example, a personal digital assistant (PDA) or a mobile communication device that includes an Internet interface 12 for providing access to an Internet content provider 14 and/or for providing access to an Internet/network based print service 16. The Internet interface 12, although preferably able to support communication via cellular telephony, may instead communicate with the Internet content provider 14 via any desired method, e.g., via satellite communication. Further, although the print by reference methods are described herein with respect to obtaining print content from the Internet, the print by reference methods may be used to obtain print content from any type of network including, for example, a local area network, a wide area network, and an intranet. Thus, the Internet content provider 14 may represent any network content provider and the Internet interface 12 may interface with any type of network.

The portable wireless device 10 further includes an RF communication interface 18 that allows the portable wireless device 10 to communicate with an RF communication interface 20 disposed in a print device 22 such as, for example, a printer or a multi-function peripheral including a print function. Although, in a preferred embodiment the RF communication interface 18 communicates with the print device 22 using a Bluetooth wireless communication protocol and OBEX packet exchange format, the RF communication interface 18 may instead communicate with the print device 22 using any desired wireless protocol and packet format. For example, in a preferred embodiment, the portable wireless device 10 may be implemented with a Bluetooth enabled notebook computer having a Bluetooth PC card manufactured by 3Com that operates according to the Bluetooth 1.1 specification and the print device 22 may be implemented using a Hewlett Packard Deskjet 995c inkjet printer having integrated Bluetooth communication capabilities.

To enable the execution of a print by reference method, the portable wireless device 10 further includes data processing and memory storage capabilities which may be implemented using, for example, a processor 19 and a memory device 21 for storing software instructions and further using a temporary memory buffer 23. A set of software instructions stored in the memory 21 may be executed by the processor 19 to enable any or all of the methods described herein or the methods may instead be implemented using hardware or a combination of hardware and software. In addition, any number of hardware components may further be used to supplement or even replace the processor 19 and memory devices 21, 23 and software instructions provided that the print by reference methods are supported thereby. As will be appreciated by one having ordinary skill in the art, the processor 19 may be implemented using any suitable processor or controller capable of executing software instructions or otherwise controlling the portable wireless device 10 to enable the print by reference methods described herein. Further, the memory devices 21, 23 may be implemented using any memory devices capable of storing data. The portable wireless device 10 further may include a display (not shown) for displaying data and a control panel (not shown) by which a user may interface with the portable wireless device 10.

A set of methods are now described as being illustrative of the variety of ways in which the print by reference method of the present invention may be implemented. Further, the methods, which are described with reference to a set of figures, i.e., FIGS. 3-7, are described as being implemented using the wireless portable device 10, the print device 22, the print service 16 and the Internet content provider 14 shown in FIGS. 1 and 2. Thus, an understanding of the methods described with respect to FIGS. 3-7 may be enhanced by reference to the components illustrated in FIGS. 1 and 2.

Figure 3:
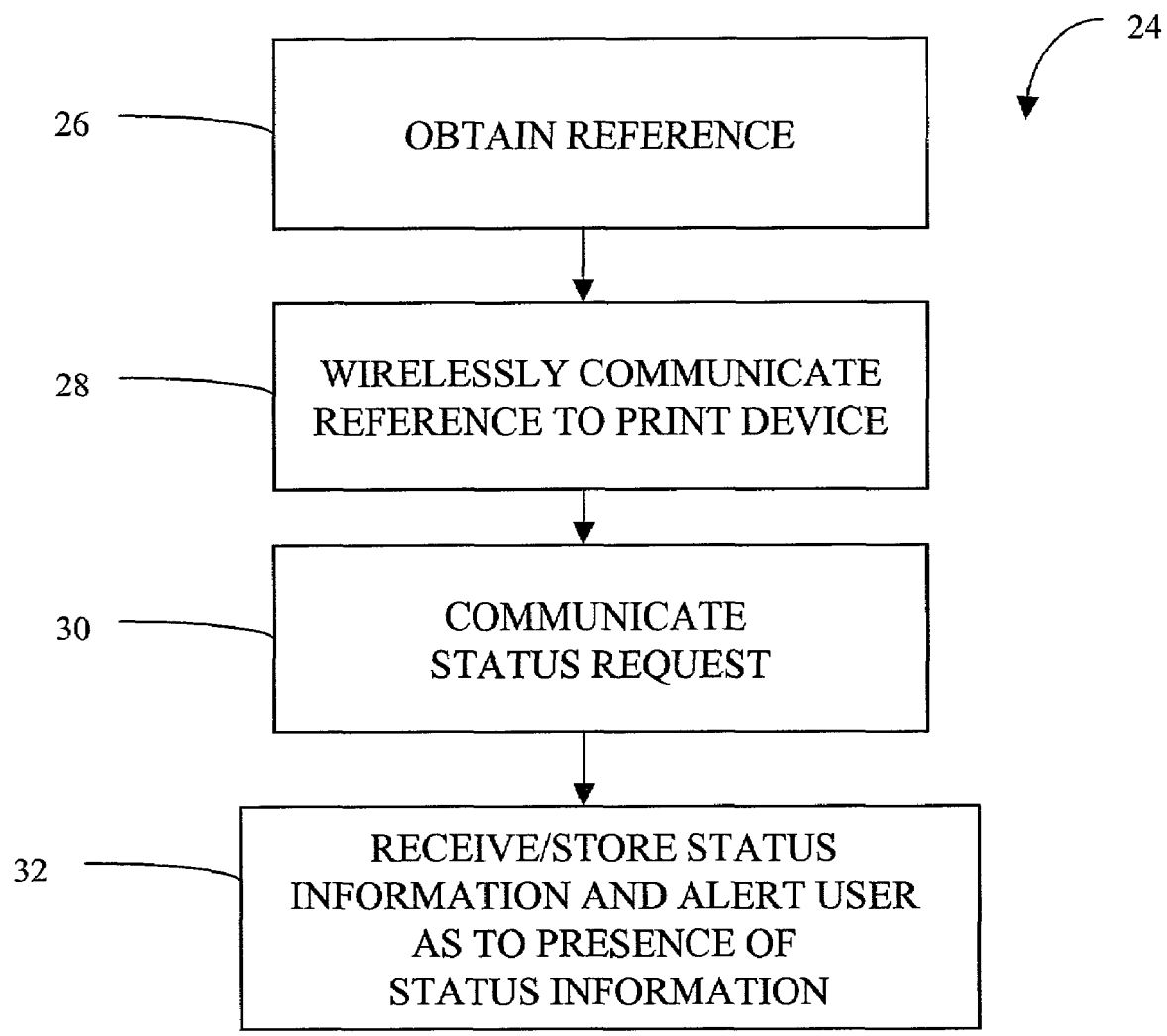
FIG. 3 is a flow chart representing a print by reference method for a portable wireless device that involves causing a print device to retrieve and print content.

Referring now to FIG. 3, a first method 24 performed by the portable wireless device 10 for causing a set of desired web pages or other desired Internet or network content to be printed may begin when the portable wireless device 10 obtains a reference that indicates the location of the desired print content (step 26). For example, the portable wireless device 10 may obtain the reference in response to a user command entered by the user while surfing the Internet via the Internet interface 12. Specifically, while using the Internet interface 12 to surf the Internet, the user may encounter the desired print content and, upon deciding to download the desired data, may cause the portable wireless device 10 to store a copy of a URL identifying the location of the desired print content into the memory device 21 disposed in the portable wireless device 10. This may occur, for example, when the user clicks on a hyperlink that causes the content provider 14 to transmit a reference to the portable wireless device 10 through the Internet interface 12. Alternatively, the user may type the URL into the portable wireless device 10 and cause the portable wireless device to store the URL in the memory device 21, or the user may enter the URL into the portable wireless device 21 using any number of known techniques such as a voice recognition/recording feature or a touch screen. Instead of being entered by the user, the reference may be received at the portable wireless device 10 via, for example, an e-mail message and then stored in the memory device 21. Thus, the preferred portable wireless device 10 obtains the reference from the Internet, the memory device 21 or from an input device associated with the portable wireless device 10 such as a keypad, voice recorder, or touch screen.

After obtaining the reference, the portable wireless device 10 may wirelessly communicate the reference to the print device 22 via the RF communication interface 18 (step 28). Wirelessly communicating the reference to the print device may further include any number of additional steps such as, for example, specifying additional data and/or establishing communication with the print device 22 in accordance with the communication protocol being used by the portable wireless device 10 and the print device 22.

Specifically, the reference may be a simple reference, e.g., a URL, to the print content, or it may include any of a variety of data to support different levels of print content retrieval and printing. For example, the reference may be formatted according to a simple data format that includes only enough information to locate the desired print content, e.g., a URL. Alternatively, the reference may be formatted according to a richer data format having a set of extensions or attribute fields that allow additional information to be supplied with the reference including, for example, a set of security access codes that may be used in response to security challenges, a URL that represents the location of a remote print service such as the print service 16 that may be used in accessing and formatting the print content for printing, and the time/date that the reference was sent to the print device 22. Other attribute fields may be defined to include, for example, a label providing a descriptive name for the location identified by the reference, a URL that represents a proxy service required to access the print content referred to by the reference, an Internet address of the portable wireless device, an alternative reference or address for obtaining the same or substitute print content, and data indicating when print content should be printed beginning on a new sheet. Further, attribute fields may be defined to include information used to restrict access to the reference. For example, a type attribute may be defined to include an encoding type that indicates how the print content at the location identified by the reference is encoded. Further, a cookie attribute may be defined to associate a print by reference job with previous information concerning reference content or a portable wireless device seeking to access referenced content. In addition, the reference may include a list of references, wherein each reference represents separate print content and a separate print document and further wherein each separate print document may be formatted differently.

As a further example, the reference may include a billing attribute that enables billing for services rendered. Specifically, any or all of the Internet content provider 14, the print service 16 and/or print device 22 may require payment for usage thus requiring that each reference include information that identifies the user of the portable wireless device 10 that originated the print by reference request so that the user may be billed for the services used. For example, the user may be provided with an account number upon subscribing to the print service 16 or to the print device 22. Further, the account number may be stored in the memory 21 disposed in the portable wireless device 10 and the portable wireless device 10 may supply the account number in an extension of the reference each time that a print by reference request is executed. The print service 16 and the print device 22 may verify that the account number is valid- before rendering service, i.e., before processing a print by reference request for the user. As will be appreciated by one having ordinary skill in the art, the billing attribute may further be used to enable billing for services rendered using any of a variety of other methods.

Accordingly, in some embodiments, the reference may specify some of all of billing information, print format information, a number of copies of the print content to be printed by a print device, and a print format data specifying that the print content should be printed beginning on a new sheet of paper. In addition, the reference may be included in a communication signal formatted according to a Bluetooth communication protocol.

In addition to including a desired set of enhanced information and formatting the reference into a proper data format, the formatting process performed at the step 28 may further involve converting/modulating the reference to a radio frequency signal at the RF interface 18 for wireless transmission to the print device 22. Of course, if the portable wireless device 10 and print device 22 are equipped with, for example, infra-red interfaces instead of RF interfaces, the formatting process will include converting/modulating the reference to an infra-red signal instead of an RF signal. Further, if the reference is obtained in a properly formatted state, then the formatting process need only include converting the reference to a signal adapted for transmission via the RF interface 12.

After having received the reference, the print device 22 may respond by using the reference to download the print content associated with the reference from the Internet content provider 14, provided, of course, that the print device 22 is able to directly access the Internet content provider 14. Alternatively, the print device 22 may instead respond to the reference by providing the reference to a network/Internet based print service 16 that downloads the print content from the Internet content provider 14, and that further formats the print content for printing and transmits the formatted print content to the print device 22 for printing.

After communicating the reference, the portable wireless device may communicate a status request to the print device 22 after a predetermined amount of time has elapsed (step 30). In response to the status request, the print device 22 may transmit status information indicating the status of the print by reference request. The status information might indicate whether the print content was successfully retrieved from the Internet and/or whether the print content was successfully printed. Upon receiving the message, the portable wireless device 10 may perform any number of tasks to handle the message (step 32) including, for example, storing the message in the memory device 21, displaying the message, and sounding an alarm that alerts the user as to the presence of the message. Alternatively, the print device 22 may automatically transmit status information to the portable wireless device 10 such that the portable wireless device 10 need not communicate a status request but need only be prepared to receive status information from the print device 22.

As will be appreciated by one having ordinary skill in the art, network security devices such as network firewalls typically prevent the reception of print content or any other information from the Internet or any other network at a user device unless initiated by the user. Thus, data transferred from the Internet content provider 14 or the print service 16 to either of the portable wireless device 10 or the print device 22 is preferably performed using a data download or data pull operation wherein the data transfer is initiated by either the portable wireless device 10 or the print device 22. This avoids the firewall problem. In contrast, data transferred from the portable wireless device 10 to the print device 22 or the print service 16 may be pushed or uploaded from the portable wireless device 10 to the print device 22 and to the print service 16. Of course, if network security is not an issue, a data transfer may occur in any manner.

Referring again to FIGS. 1 and 2, the portable wireless device 10 may identify the print device 22 to which the reference is communicated using any number of methods. For example, the portable wireless device 10 may be preconfigured to communicate the reference to a print device 22 that is proximally located to the user during the user's daily routine, i.e., a print device residing in the user's office where the user spends most of the work day. As will appreciated by one having ordinary skill in the art, the portable wireless device 10 may be preconfigurable using any number of methods, including for example, a menu driven method wherein the portable wireless device 10 displays a print device selection menu that allows the user to select one or more print devices 22. Additionally, the portable wireless device 10 may supply a data input field in which the user may specify a default or preferred print device 22.

Figure 4:
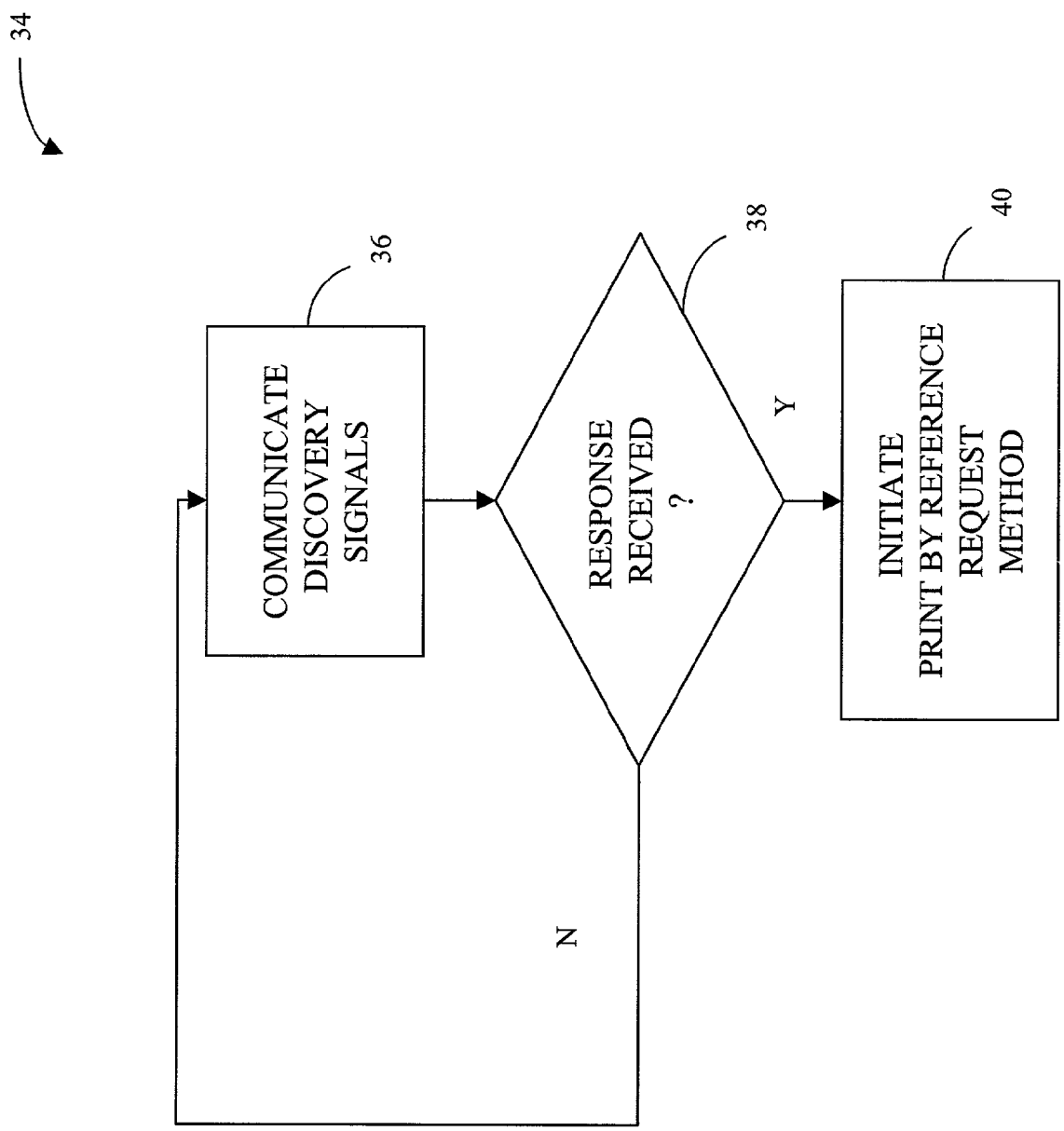
FIG. 4 is a flow chart representing a method for discovering a print device for use in a print by reference method.

Referring now to FIG. 4, in another embodiment, the portable wireless device 10 may perform a method 34 for locating a print device 22 by wirelessly communicating discovery signals according to a conventional local network discovery protocol. Specifically, a user may initiate the network discovery protocol using, for example, a print device discovery command which may cause the portable wireless device 10 to communicate a discovery signal that includes a request for information (step 36).

As will be appreciated by one having ordinary skill in the art, conventional network discovery features allow a user operating a network device to discover other devices attached to the network. Further, the discovery feature is typically defined, at least in part, by the communication standard or specification associated with the network in use. Thus, the portable wireless device 10 may transmit discovery signals according to the communication protocol for which the portable wireless device is configured. For example, if configured to operate using a Bluetooth communication protocol, the portable wireless device 10 may perform the discovery feature using a Service Discovery Protocol defined in the Bluetooth communication specification.

The portable wireless device 10 may then wait until a response is received from one or more locally disposed print devices 22 (step 38). The responsive signals may include, for example, instructions regarding the location of the responding print devices 22 so that the user may proceed to the nearest print device 22 and initiate a print by reference method (step 40) such as the method 24 described with respect to FIG. 3.

The responsive signals may further include information pertaining to the capabilities of the responding print device(s) 22. For example, the responsive signals may include information specifying whether the print device 22 has color printing capabilities, whether the print device 22 is equipped for printing specialized graphics files and further specifying the costs associated with using the print device 22 to print a document. The portable wireless device 10 may display the responsive information or otherwise communicate the information to the user so that the user may determine which of the responding print devices 22 to select. Of course, if no responsive signals are received at the portable wireless device 10, the portable wireless device 10 may again transmit print device discovery signals (step 36) for any number of times, until a responsive signal is received, or until the user halts the print device discovery method 34.

The print device discovery feature may be especially useful for the traveling user who frequents airports or other public places that may include, for example, kiosks equipped with print devices 22 for use by airport visitors. Thus, for example, the responding print device 22 may provide the user with an airport terminal name and gate at which the kiosk is located. With appropriate billing information, the user might also be able to print a ticket from a responding print device 22. As will further be appreciated by one having ordinary skill in the art, the portable wireless device 10 may initiate a network discovery protocol in response to any number of user inputs. For example, the portable wireless device 10 may display a menu having a plurality of options wherein one of the available options allows the user to initiate the network discovery protocol. Alternatively, the portable wireless device 10 may be equipped with a control switch or button that, when depressed by the user, causes the network discovery protocol to be invoked and when depressed a second time causes the network discovery protocol to be halted. Instead, the portable wireless device 10 might also automatically invoke the network discovery protocol every time the portable wireless device 10 is powered up or every time a print by reference request is initiated.

Figure 5:
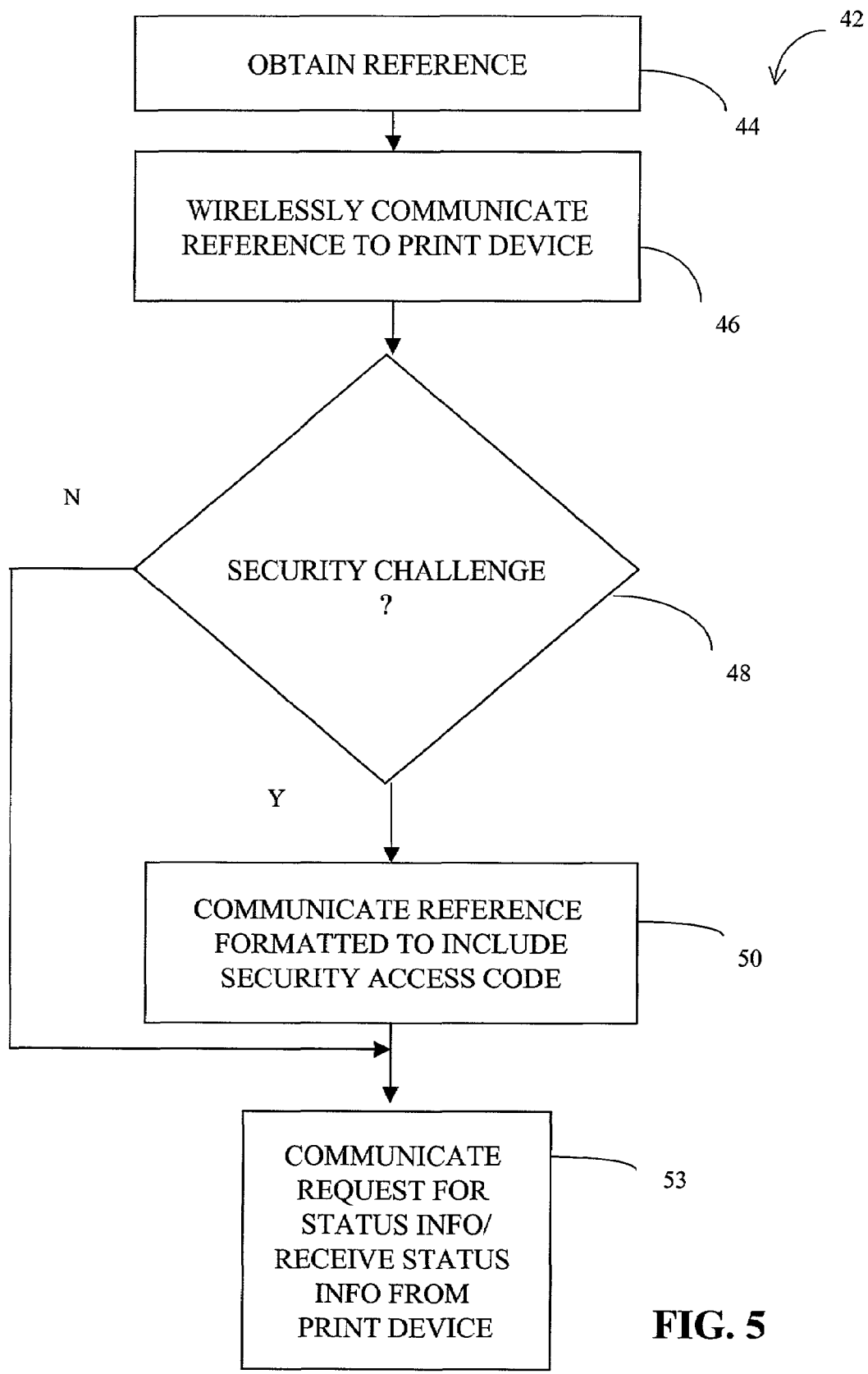
FIG. 5 is a flow chart representing a print by reference method that involves supplying a security access code to a print device.

Referring now to FIG. 5, as described with respect to the method 24 of FIG. 3, the step of wirelessly communicating the reference may involve supplementing the reference with additional information. For example, the reference may be supplemented to include security access code(s) that enable usage of the print device 22 and/or the print service 16, or that may enable access to the desired print content. In another embodiment, the portable wireless device may format the reference to specify security access codes only in response to a security challenge received from the print device 22, print service 16 or Internet content provider 14 after initially sending a reference without codes.

In particular, the portable wireless device 10 may perform a print by reference method 42 that begins when the portable wireless device 10 obtains the reference (step 44). After obtaining the reference, the portable wireless device 10 may wirelessly communicate the reference to the print device in a format that does not include a security access code (step 46).

In response to the reference, the print device 22, print service 16 or the Internet content provider 14 may supply a security challenge to the portable wireless device 10 to inform the portable wireless device that usage of the print device 22 and/or the print service 16 and/or that access to the print content has been denied and further requesting a security access code.

The security challenge may be routed from the device that originated the security challenge to the portable wireless device 10 via the print device 22 or may instead be directly transmitted to the portable wireless device 10 by the device originating the security challenge. In any event, the portable wireless device 10 receives the security challenge (step 48) and then responds to the security challenge by formatting the reference to specify the required security access codes and then wirelessly communicating the formatted reference to the print device 22, print service 16 or Internet content provider 14 as required (step 50). For example, the portable wireless device 10 may communicate the formatted reference to the print device 22 which may then forward the formatted reference to the print service 16 and/or Internet content provider 14. Alternatively, the portable wireless device 10 may communicate the formatted reference to the print service 16 and/or the Internet content provider 14 directly. Once the security access code has been received by the device originating the security challenge, the print content may be downloaded and then transmitted to the print device 22 for printing.

After the reference having the security access codes has been successfully communicated to the print device 22, the portable wireless device 10 may request and receive status information from the print device 22 (step 53). Likewise, if a security challenge is not received at the step 48, the portable wireless device 10 may request and receive status information from the print device 22 (step 53).

As will be appreciated by one having ordinary skill in the art, as an alternative to supplying security access code(s) via the reference, the security access code(s) may instead be supplied in a separate message communicated with, before or after the reference.

Figure 6:
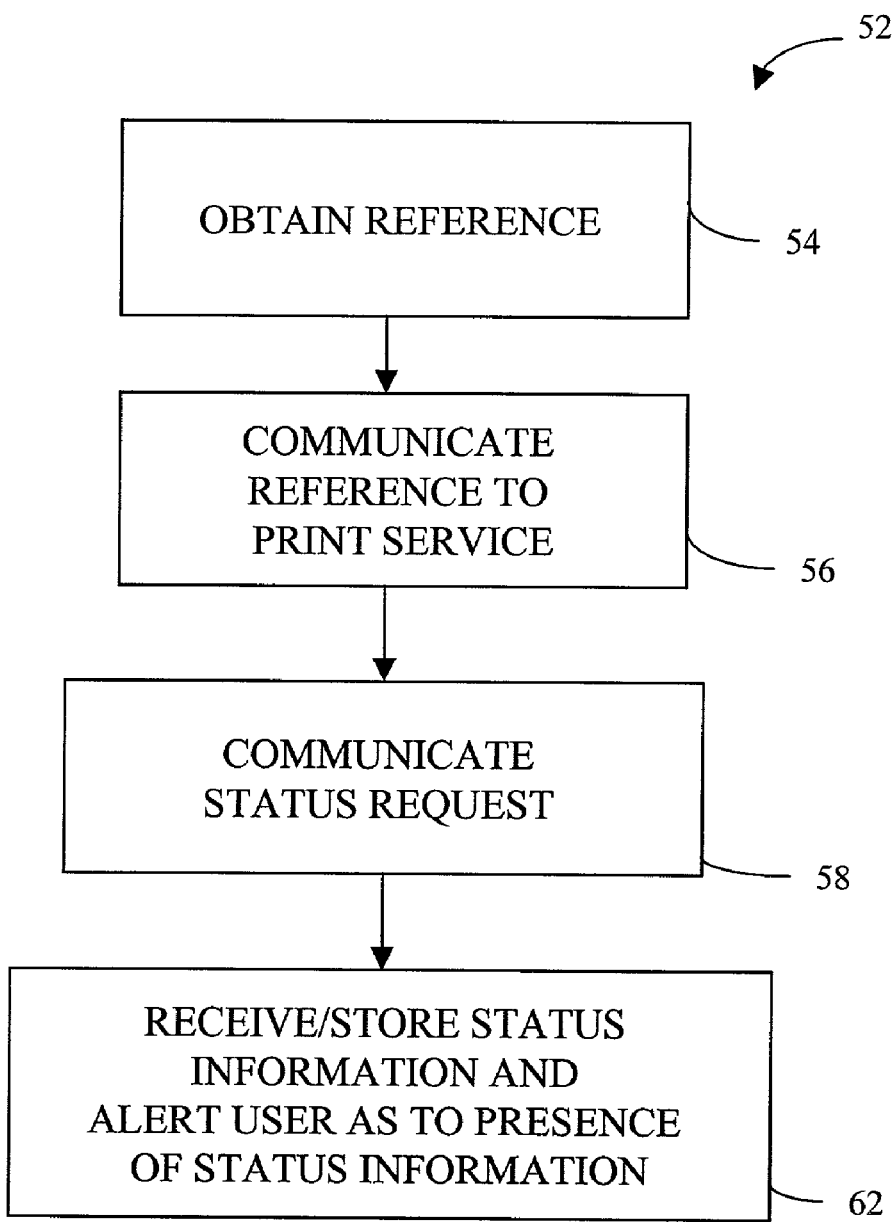
FIG. 6 is a flow chart representing a print by reference method that involves sending a reference to a print service, causing the print service to retrieve print content associated with the reference, and further causing the print service to transmit the print content to a print device for printing; and, FIG. 7 is a flow chart representing a print by reference method that involves sending a reference to a print service, causing the print service to retrieve print content associated with the reference, and further causing the print service to transmit the print content to the portable wireless device.

Referring now to FIG. 6, in a still further embodiment the portable wireless device 10 may communicate directly with the print service 16 instead of the print device 22 according to another method 52. Specifically, the method 52 begins when the portable wireless device 10 obtains a reference that indicates the location of the desired print content (step 54) and that further specifies a print device 22 to which the print content shall be forwarded for printing. The reference is then communicated to the print service 16 (step 56). Of course, if the reference is not obtained with information that specifies a print device 22, then the step of communicating the reference to the print service 16 will include the step of supplementing the reference with information that specifies a print device 22 to which the print content shall be forwarded for printing. The print service 16 responds to the reference by downloading the desired content and then forwarding the desired print content in a print ready format to the print device 22 specified in the reference. Provided that the print device 22 has the capability to convert the print content to a print ready format, the print service 16 may instead supply the print content to the specified print device 22 in non-print ready format, in which case, the print device 22 will be required to perform any format conversions necessary to enable printing of the print content.

At any time after the portable wireless device has sent the reference to the print service 22, the portable wireless device 10 may transmit a status request to the print device 22 (step 58) and then, upon receiving responsive status information from the print device 22, may store the status message and alert the user as to the presence of the message (step 60).

Figure 7:
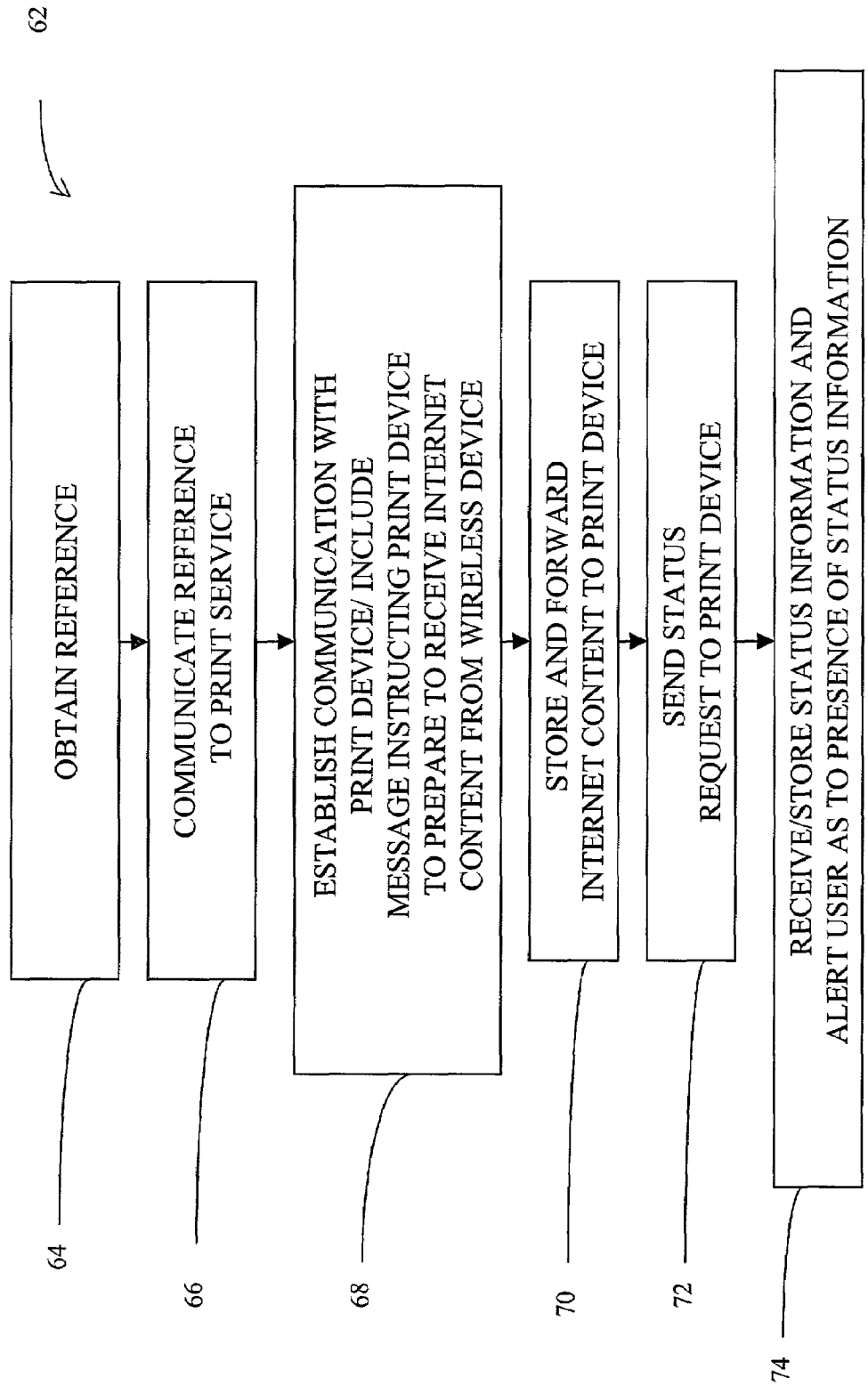

Referring now to FIG. 7, in a still further embodiment the portable wireless device 10 may communicate directly with the print service 16 and cause the print service 16 to transmit the print content back to the portable wireless device 10 instead of the print device 22. Specifically, a method 62 begins when the portable wireless device 10 obtains a reference that indicates the location of the desired print content (step 64) and that specifies that the print content is to be delivered to the portable wireless device 10. The portable wireless device 10 then communicates the reference to the print service 16 (step 66).

The print service responds to the reference by downloading the desired print content, and then transmitting the desired print content to the portable wireless device 10 as specified in the reference. In addition to sending the reference to the print service 16, the portable wireless device 10 establishes communication with the print device 22 via the RF interface 18 and sends a message instructing the print device to prepare to receive print content or any other print content from the portable wireless device 10 (step 68).

Upon receiving the print content from the print service 16, the portable wireless device 10 may use a store and forward, e.g., streaming, operation to transmit the print content to the print device 22 (step 70). The store and forward operation may be performed using any of a variety of steps including temporarily storing the data received from the print service 16 in the memory buffer 23 disposed in the portable wireless device 10, converting the buffered data to a format suitable for transmission via the RF interface 18, and transmitting the RF formatted print content to the print device 22 for printing. After transmitting the print content to the print device 22, the portable wireless device 10 may communicate a status request to the print device 22 (step 72). Upon receiving status information from the print device 22, the portable wireless device 10 may store the message and/or alert the user as to the presence of the message (step 74).

The portable wireless device 10 may receive one or more error messages from one or more of the print device 22, print service 16 or the Internet content provider 14 during any of the methods described herein. Moreover, the portable wireless device 10 may perform any of a variety of desired tasks in response to any of the received error messages during any of the methods. For example, in response to an error message indicating that the reference does not exist or cannot be accessed, the portable wireless device 10 may display a message informing the user as to the inaccessible status of the reference.

From the foregoing description, it should be understood that a print by reference method for portable wireless devices has been shown and described, having many desirable attributes and advantages. In particular, the method provides a portable wireless device user with print capabilities. Specifically, the method causes the portable wireless device to obtain a reference corresponding to a location at which desired network content is located and then wirelessly communicate the reference to a print device or a print service. The reference causes the print device to access a network content provider to download the desired print content or instead causes the print device to forward the reference to a print service which accesses a network content provider to download the desired print content. After downloading the print content, the print service may format the print content for printing and then deliver the formatted print content to the print device for printing. Likewise, if retrieved by the print device, the network print content is formatted for printing and then printed by the print device.

While various embodiments of the present invention have been shown and described, it should be understood that other modifications, substitutions and alternatives are apparent to one of ordinary skill in the art. For example, although the steps of the methods described herein are illustrated and described as being performed in a particular order, many of the steps may be performed in a different order without affecting the end result, i.e., printed network content.

Such modifications, substitutions and alternatives can be made without departing from the spirit and scope of the invention, which should be determined from the appended claims.

Various features of the invention are set forth in the appended claims.

What is claimed is:

1. A print by reference method executable by a portable wireless device, the method comprising the steps of:
   obtaining a reference to print content stored at a location indicated by the reference; and
   wirelessly communicating the reference to another device to initiate a print by reference of the print content,
   wherein the print content is printed in response to receipt of the reference by the another device, and wherein the print content is not communicated to the another device by the wireless device.

2. The method of claim 1, wherein the reference specifies a number of copies of the print content to be printed by a print device.

3. The method of claim 1, wherein the another device comprises a print service adapted to use the reference to obtain the print content, and wherein the print content is printed in response to receipt of the reference by the print service.

4. The method of claim 3 wherein the reference specifies a print device to which the print service is adapted to transmit the print content.

5. The method of claim 3 further comprising the step of receiving the print content from the print service.

6. The method of claim 5 further comprising the step of passing the print content to a print device for printing.

7. A print by reference method executable by a portable wireless device, the method comprising the steps of:
- obtaining a reference to print content stored at a location indicated by the reference; and
- wirelessly communicating the reference to another device to initiate a print by reference of the print content,
- wherein the print content is printed in response to receipt of the reference by the another device, and wherein the print content is stored at a location directly specified by the reference and is not included in the reference.

8. The method of claim 7, wherein the reference specifies print format information.

9. A print by reference method executable by a portable wireless device, the method comprising the steps of:
- obtaining a reference to print content stored at an Internet location indicated by the reference;
- including the reference in a communication signal formatted according to a Bluetooth communication protocol; and
- wirelessly communicating the communication signal to a print device thereby causing the print device to use the reference to retrieve the print content from the Internet and to print the print content, wherein the communication signal is wirelessly communicated directly from the portable wireless device to the print device.

10. A print by reference method executable by a portable wireless device, the method comprising the steps of:
- obtaining a reference to print content stored at an Internet location indicated by the reference;
- including the reference in a communication signal formatted according to a Bluetooth communication protocol; and
- wirelessly communicating the communication signal to a print device thereby causing the print device to use the reference to retrieve the print content from the Internet and to print the print content, wherein the communication signal is received in wireless form by the print device.

11. The method of claim 10, wherein the print content is printed in response to receipt of the reference by the print device.

12. A print by reference method executable by a portable wireless device, the method comprising the steps of:
- obtaining a reference to print content stored at a location indicated by the reference; and
- wirelessly communicating the reference to a printer to initiate a print by reference of the print content by the printer in response to receipt of the reference by the printer, wherein the printer provides the reference to a print service different from the wireless device and the printer, and receives the print content from the print service in response.

13. A print by reference method executable by a portable wireless device, the method comprising the steps of:
- obtaining a reference to print content stored at a location indicated by the reference; and
- wirelessly communicating the reference to a printer to initiate a print by reference of the print content by the printer in response to receipt of the reference by the printer, wherein the printer provides the reference to a content provider different from the wireless device and the printer, and receives the print content from the content provider in response.

* * * * *

UNITED STATES PATENT AND TRADEMARK OFFICE
CERTIFICATE OF CORRECTION

| | |
|---|---|
| PATENT NO. | : 7,385,718 B2 |
| APPLICATION NO. | : 09/897653 |
| DATED | : June 10, 2008 |
| INVENTOR(S) | : Alan Chris Berkema et al. |

It is certified that error appears in the above-identified patent and that said Letters Patent is hereby corrected as shown below:

On the title page, item (56), under "U.S. PATENT DOCUMENTS",
above "5,848,413 A * 12/1998 Wolff…………..707/10"
insert -- 5,539,665 A * 07/1996 Lamming et al. …………..709/224 --.

Signed and Sealed this

Fourth Day of November, 2008

JON W. DUDAS
*Director of the United States Patent and Trademark Office*